P. A. BENKISER.
CAR WINDOW CLEANING DEVICE.
APPLICATION FILED NOV. 26, 1920.
1,431,357.
Patented Oct. 10, 1922.
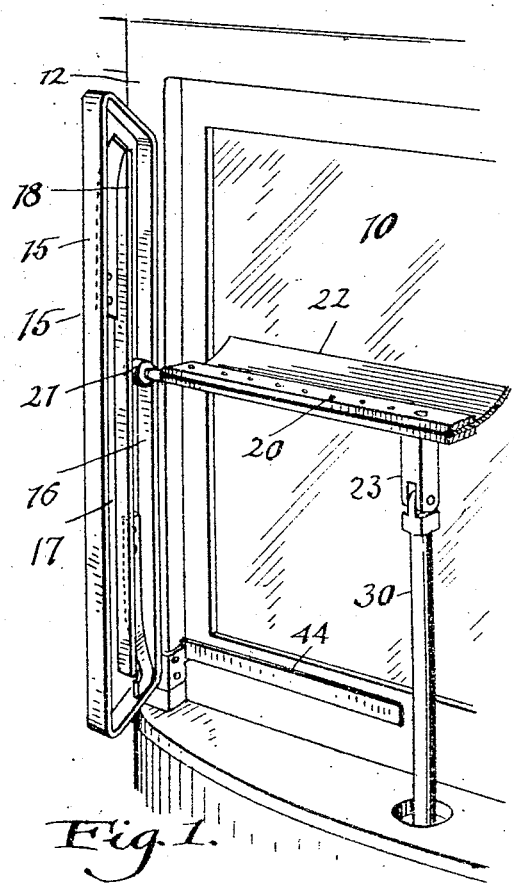
Fig.1.
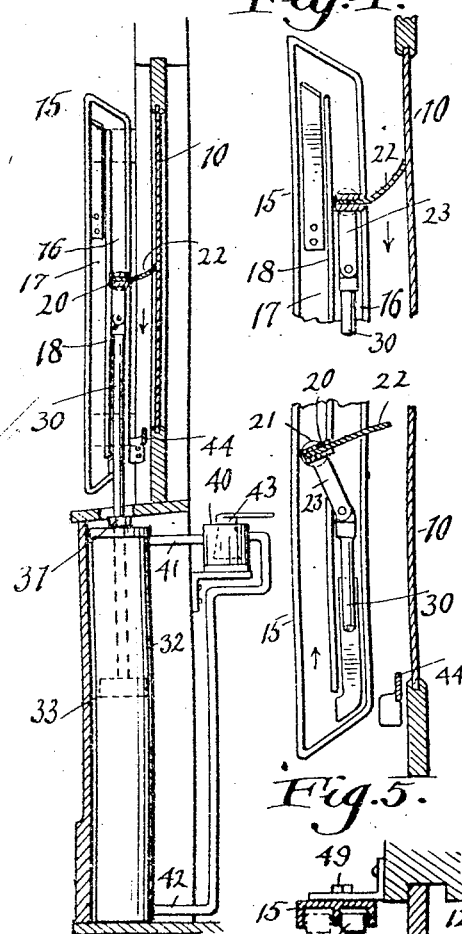
Fig.4.
Fig.3.
Fig.5.
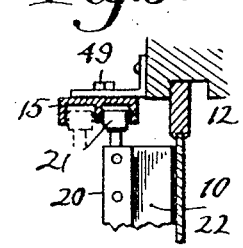
Fig.6.
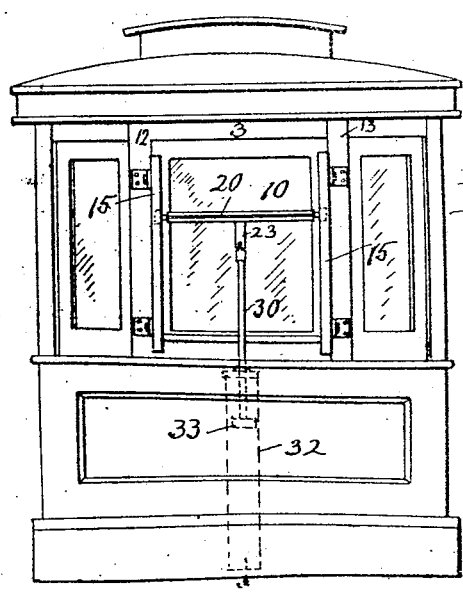
Fig.2.
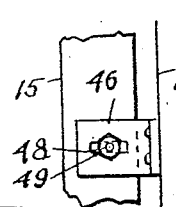
Fig.7.
Inventor:
Paul A. Benkiser
by
Thurston Kwis & Hudson
attys Patented Oct. 10, 1922.

1,431,357

UNITED STATES PATENT OFFICE.

PAUL A. BENKISER, OF CLEVELAND, OHIO.

CAR-WINDOW-CLEANING DEVICE.

Application filed November 26, 1920. Serial No. 426,445.

*To all whom it may concern:*

Be it known that I, PAUL A. BENKISER, a citizen of the United States, residing at Cleveland, in the county of Cuyahoga and State of Ohio, have invented a certain new and useful Improvement in Car-Window-Cleaning Devices, of which the following is a full, clear, and exact description.

The object of this invention is to enable the driver of a vehicle to clean the snow and rain from the front window of his vestibule. The invention is designed especially for use on street cars, but obviously it can be used on any vehicle which has a front window from which it is desirable that the snow and water shall be wiped from time to time to enable the driver to see clearly through it.

The invention consists in the construction and combination of parts shown in the drawing, hereinafter described and pointed out definitely in the appended claims.

In the drawing, Fig. 1 is a perspective view of a part of the front end of a street car equipped with the present invention; Fig. 2 is a front elevation of a street car equipped with the present invention; Fig. 3 is a sectional side elevation in the plane indicated by line 3—3 on Fig. 2; Fig. 4 is a sectional side elevation of the upper part of the device when the parts are in the position they occupy when the window scraper is being drawn down to wipe the window glass. Fig. 5 is a sectional side view showing the position of the parts when the window scraper is being moved up; Fig. 6 is a sectional plan view showing one of the brackets through which the guide bars are connected with the window casing. Fig. 7 is a side view of the bracket construction shown in Fig. 6.

Referring to the parts by reference characters, 10 represents the front glass window of the vestibule of the street car; and 12 and 13 represent respectively the side members of the window casing.

Secured to each of the casing members 12 and 13 is a vertical wiper guide 15, each of which has on its inner face two parallel vertical guide grooves 16 and 17 which are separated by a vertical partition 18 which does not extend either to the top or the bottom of the guide, but leaves a passageway above and below it through which the two guide grooves 16 and 17 may communicate.

20 represents a wiper bar which extends transversely; and it has rollers 21 mounted on its ends adapted to project into the grooves in the guides.

A rubber wiper 22 is fixed to and extends from this wiper bar toward the window glass; and this wiper is of such width that when the two rollers 21 are in the rear guide groove 16, the wiper will engage the window glass; but when the rollers are in the two front grooves 17 it is out of contact with the glass.

The wiper bar is provided midway between its ends with an arm 23 which extends downward therefrom and at a slight angle rearward; and this arm is pivoted to the upper end of an endwise movable vertical piston rod 30. This rod passes down through a stuffing box 31 into a fixed vertical cylinder 32, and is attached to a piston 33 slidably fitted therein.

Inside the vestibule is a valve casing 40 from which run two pipes, viz: pipe 41 which is connected with the cylinder above the piston, and pipe 42 which is connected with the cylinder below the piston. This valve casing is of course to be connected with a source of compressed air; and it contains a valve 43 of familiar construction adapted to be so turned that compressed air can be admitted to the upper end of the cylinder and exhausted from the lower end, or admitted to the lower end of the cylinder and exhausted from the upper end.

If compressed air is let into the upper end of the cylinder the piston will be moved down; and in this movement will drag the wiper bar down; and said wiper bar as it moves down will have its rollers in the rear grooves 16, and therefore the wiper 22 will be pressed against the glass and will wipe therefrom snow or water which has accumulated thereon.

When the rollers reach the bottom of the groove 17 they will engage the lower inclined wall 19 of the guide grooves whereby the rollers will be shifted forward so that they will lie beneath the guide groove 17, and the wiper will also be moved forward so that it can not touch the window glass.

When now air is admitted to the lower end of the cylinder, the piston therein is pushed up, and it, through the piston rod 30, will push the wiper bar up, the rollers of said wiper bar traveling up in the front grooves 17. When they do so travel the wiper 22 will be out of contact with the window glass.

At the top of the groove 17 are means by which to prevent the roller from descending in said grooves, and for causing said rollers to be moved rearward into line with the grooves 16. Any suitable means for so guiding the rollers may be provided, but the means shown consist of a flat spring secured near its lower end in the groove 17, the upper free end of said springs terminating adjacent the top of the dividing partition 18. When the rollers pass above the upper end of these springs the free end of each spring will fly out beneath the adjacent roller and prevent it from descending in the groove 17. The upper end of the spring is slightly inclined downward so that when any force is applied to move the wiper bar down, the rollers will slide on this inclined face downward and rearward, and will enter the rear grooves 16. In other words, the wiper bar moves up with its rollers in the front guide groove 17 and the wiper 22 does not touch the window glass; and when the wiper bar is drawn down its rollers must move in the rear groove 16, in which event the wiper does engage the window glass and clean it.

The angle at which the arm 23 stands with respect to the wiper bar is such that when the rod 30 is being drawn down it not only pulls the wiper bar down but it also rocks said wiper bar so that the wiper 22 is pressed with considerable force against the glass, as will be seen in Fig. 4. When the wiper bar is being pushed upward with its rollers in the front grooves 17 the wiper bar is rocked in the direction which carries the edge of the wiper away from the glass, as shown in Fig. 5.

A transverse cleaner bar 44 is secured to the window casing in such a position in front of and out of contact with the window glass that it will be engaged by the wiper 22 when that wiper is descending and has reached substantially its lowest point; and this contact will be maintained as the rollers move downward and forward into alignment with the front grooves 17. By this action the bar 44 will scrape from the wiper any snow or dirt which may have adhered thereto as the result of wiping the window glass.

Each of the guides 15 has an adjustable connection with the window frame, so that the guides may be moved forward and backward and maintain the operativeness of the device as the operative edge of the wiper 22 becomes worn. This connection is secured to the window frame by means of two brackets 46, each of which has a horizontal slot 47 for the reception of a bolt 48 carried by the guide. When the guide has been moved forward or backward to the desired position it is secured there by a nut 49 which screws onto the bolt 48.

Having described my invention, I claim:

1. In a window cleaning device, the combination of two vertical guides located on opposite sides of the window to be cleaned and each having in its inner face two guide grooves which are in communication at their upper and lower ends, a wiper bar extending between the guides and at its ends adapted to run in said guide grooves, means for operating the wiper bar comprising a plunger movable in an endwise direction only, said wiper bar being pivoted to the plunger on an axis located below the wiper so that the wiper bar and wiper may swing toward and from the window, and means for causing the wiper bar to ascend in the outer grooves of the guides and to descend in the inner grooves thereof when the plunger is moved up and down.

2. In a window cleaning device, the combination of two vertical guides located on opposite sides of the window to be cleaned and each having in its inner face two guide grooves which are in communication at their upper and lower ends, a wiper bar extending between the guides and at its ends adapted to run in said guide grooves, means for operating the wiper bar comprising a plunger movable in an endwise direction only, said wiper bar being pivoted to the plunger on an axis located below the wiper so that the wiper bar and wiper may swing toward and from the window, means for causing the wiper bar to ascend in the outer grooves of the guides and to descend in the inner grooves thereof when the plunger is moved up and down, and a transverse cleaner bar adapted to extend across the lower part of the window to be cleaned, so that the wiper will scrape over it when the wiper and wiper bar are substantially at their lowermost position.

3. In a window cleaning device, the combination of two vertical guides located on opposite sides of the window to be cleaned and each having in its inner face two guide grooves which are in communication at their upper and lower ends, a wiper bar extending between the guides and at its ends adapted to run in said guide grooves, means for operating the wiper bar comprising a plunger movable in an endwise direction only, said wiper bar being pivoted to the plunger on an axis located below the wiper so that the wiper bar and wiper may swing toward and from the window, means for causing the wiper bar to ascend in the outer grooves of the guides and to descend in the inner grooves thereof when the plunger is moved up and down, brackets for securing the guides to the frame of the window to be cleaned, and means securing the guides to said brackets so that the position of the guides may be adjusted.

In testimony whereof, I hereunto affix my signature.

PAUL A. BENKISER.